United States Patent [19]
Kawado et al.

[11] Patent Number: 5,391,403
[45] Date of Patent: Feb. 21, 1995

[54] METHOD OF MANUFACTURING A SENSOR HAVING A MAGNETIC FILM

[75] Inventors: Yasuhumi Kawado, Yamaguchi; Tsutomu Shimizu, Hiroshima; Jiro Kondo, Hiroshima; Hideharu Iwakuni, Hiroshima, all of Japan

[73] Assignee: Mazda Motor Corporation, Hiroshima, Japan

[21] Appl. No.: 146,437

[22] Filed: Oct. 29, 1993

Related U.S. Application Data

[63] Continuation of Ser. No. 801,644, Dec. 2, 1991, abandoned.

[30] Foreign Application Priority Data

Nov. 30, 1990 [JP] Japan ................... 2-340068

[51] Int. Cl.⁶ .............................. B05D 3/06
[52] U.S. Cl. ...................... 427/453; 427/128; 427/131; 427/132; 427/422; 427/427; 427/456; 427/476; 427/599
[58] Field of Search ............... 427/127–132, 427/453, 456, 599, 516, 427, 422

[56] References Cited

U.S. PATENT DOCUMENTS 4,230,748 10/1980 Patel ........................... 427/423
4,897,283 1/1990 Kumar ...................... 427/427 X

FOREIGN PATENT DOCUMENTS 61-53504 3/1986 Japan .
62-6129 1/1987 Japan .

*Primary Examiner*—Bernard Pianalto
*Attorney, Agent, or Firm*—Thompson, Hine and Flory

[57] ABSTRACT

Particles such as magnetic iron oxide capable of being magnetized are crushed to obtain minute magnetic particles each size of which is not larger than 10 μm. The minute magnetic particles are mixed as they are dispersed with such a binding material as cobalt or nickel. Thermal spraying particles each size of which is not smaller than 10 μm are obtained from the mixture. Then, the thermal spraying particles are sprayed upon such a member as a turbine shaft to form a magnetic film on the member with plasma spraying method.

6 Claims, 4 Drawing Sheets

| Sample | Volume Decrease (mm³) 50  100  150  200 |
|---|---|
| A | 100 |
| B | 50-75 |
| C | 75 |
| D | 150 |
| E | 150 |
| F | 150 |
| G | 125 |
| H | 125 |
| I | 100 |
| J | 100 |
| K | 125-150 |

METHOD OF MANUFACTURING A SENSOR HAVING A MAGNETIC FILM

This is a continuation of application Ser. No. 07/801,644, filed Dec. 2, 1991, abandoned.

BACKGROUND OF THE INVENTION

The present invention relates to a method of manufacturing a sensor having a magnetic film, and more particularly, a sensor having a magnetic film which measures a torque received by a shaft member, and rotating speed and rotating angle of the shaft member accurately.

There has been a known method of manufacturing a sensor having a magnetic film by spraying a molten magnetic material to form a magnetic film on the surface of a shaft member, and a known method of measuring a torque received by the shaft member by utilizing the characteristic of the magnetic film of the sensor (The Japanese Patent Application Laying Open Gazette No. 61-53504).

When particles consisting of crystals are used for a magnetic material and a magnetic field is impressed upon the particles, the domain walls of the particles move so that each volume of the domains spontaneously magnetized in the direction of the magnetic field is increased and also the magnetization along with the magnetic field is increased.

In this case, the smaller the particles used for magnetic material are, the more the number of domain walls of the magnetic film becomes, so that a strong magnetic field can be impressed upon a magnetic film, and a number of domain walls move. Consequently, even after the value of the magnetic field impressed upon the magnetic film has returned to 0, regenerated output at the time of measuring is increased, as well as a reverse magnetic field necessary to make the value of coercive force, that is, a residual magnetization 0 is increased because high residual magnetization can be obtained by a number of domain walls which has once moved.

However, in the case of thermal spraying of the above mentioned minute particles by plasma spraying on a member to form a magnetic film on the surface of the member, the thermal spraying particles are so light that they cannot be supplied to the flame of the plasma spraying or they are struck and scattered by the flame. Namely, there is raised a problem such that the thermal spraying particles are not accurately adhered on the member to be sprayed.

Accordingly, the number of the above mentioned domain walls cannot be increased beyond a certain extent because minute particles consisting of crystals cannot be used as thermal spraying particles. Therefore, according to a conventional method, there is a problem such that a magnetic film of high regenerated output and of high coercive force cannot be formed on a member to be sprayed.

SUMMARY

The present invention has been made in view of the above mentioned points, and objects of the present invention are to increase the number of domain walls in a magnetic film by developing the adhesiveness of minute particles to a member to be sprayed, and to enhance regenerated output and coercive force of the magnetic film.

In order to achieve the above mentioned objects, a method of manufacturing a sensor having a magnetic film in the present invention comprises steps of crushing particles capable of being magnetized to obtain minute magnetic particles each size of which is not larger than 10 $\mu$m, forming thermal spraying particles each size of which is not smaller than 10 $\mu$m with mixing the minute magnetic particles with a binding material as said minute magnetic particles are dispersed, and forming a magnetic film capable of recording a magnetic signal on a member to be sprayed by spraying the thermal spraying particles upon the member to be sprayed. The above constitution makes it possible to avoid such problems that thermal spraying particles are not supplied to the spraying flame or are struck by the flame and scattered, because each thermal spraying particle size for thermal spraying on the member to be sprayed is not smaller than 10 $\mu$m. Therefore, the thermal spraying particles are adhered effectively on the member to be sprayed. It is possible to make the number of the domain walls formed on a magnetic film larger than that of a conventional one because the magnetic particle size is not larger than 10 $\mu$m. Thus, residual magnetization on the magnetic film, in the case the value of a magnetic field has been returned to 0 after a strong magnetic field was impressed upon the magnetic film, can be increased, so that regenerated output at the time of measuring with a magnetic decoding head can be enhanced. Further, a reverse magnetic field necessary to make the value of coercive force, that-is residual magnetization 0 can be also increased, so that a write pitch at the time of recording a magnetic signal on a magnetic film can be narrowed down.

When one of magnetic iron oxide and cobalt both capable of being magnetized is used as a magnetic material and a binding material, all of the thermal spraying particles are capable of being magnetized, so that regenerated output at the time of measuring with the magnetic decoding head is further increased and a write pitch at the time of recording a magnetic signal can be further narrowed down.

By using magnetic iron oxide as a magnetic material and at least one among cobalt, nickel, and iron, as a binding material, a magnetic film of high regenerated output at the time of measuring, which is capable of narrowing the write pitch for recording a magnetic signal can be obtained with a low cost.

DETAILED DESCRIPTION OF THE INVENTION

Embodiments of the present invention are described with the accompanying drawings.

Figure 1:
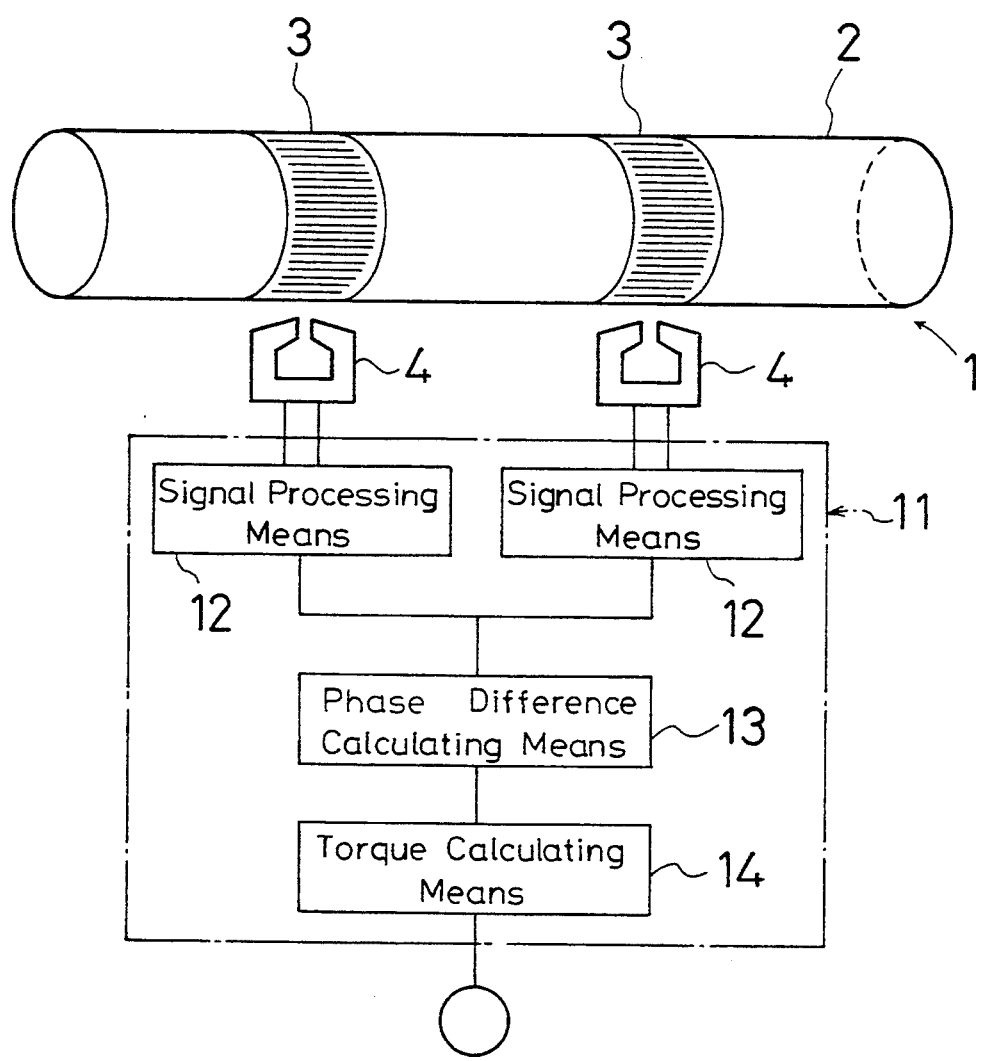
FIG. 1 is a drawing of a sensor having magnetic films in embodiments of the present invention.
Figure 2:
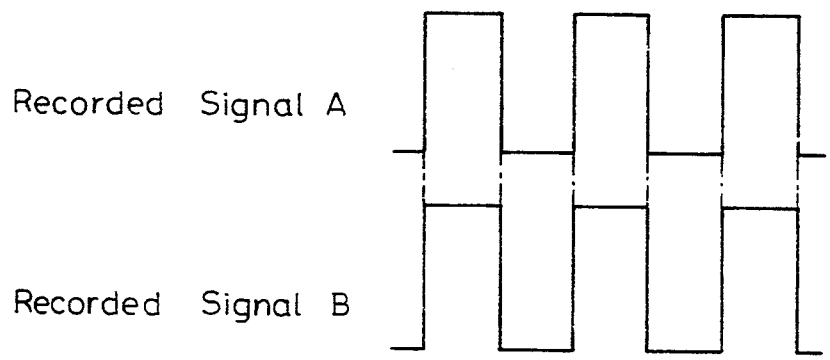
FIG. 2 is a drawing of recorded signals of magnetic films recorded with a pair of magnetic signal recording heads.

A sensor 1 having magnetic films as shown in FIG. 1 comprises a turbine shaft 2 provided in a torque converter (not shown in the drawing) made of aluminum, and magnetic films 3 having a thickness of 100 $\mu$m formed at a predetermined space circumferentially on the surface of the turbine shaft 2.

Writing of magnetic signals on the magnetic films 3 of the turbine shaft 2 is conducted as follows; the turbine shaft 2 is rotated at the speed of 600 rpm and pulse signals (recording signal A and B) are written at 15 V by a pair of signal recording heads (not shown in the drawings) contacting with the magnetic films 3 of the turbine shaft 2 respectively.

Decoding magnetic signals from the magnetic films 3 of the turbine shaft 2 is conducted as follows;

As shown in FIG. 1, a pair of magnetic signal decoding heads 4 are respectively arranged outside the turbine shaft 2 facing against each magnetic film 3 in stead of the above magnetic signal recording heads.

Figure 3:
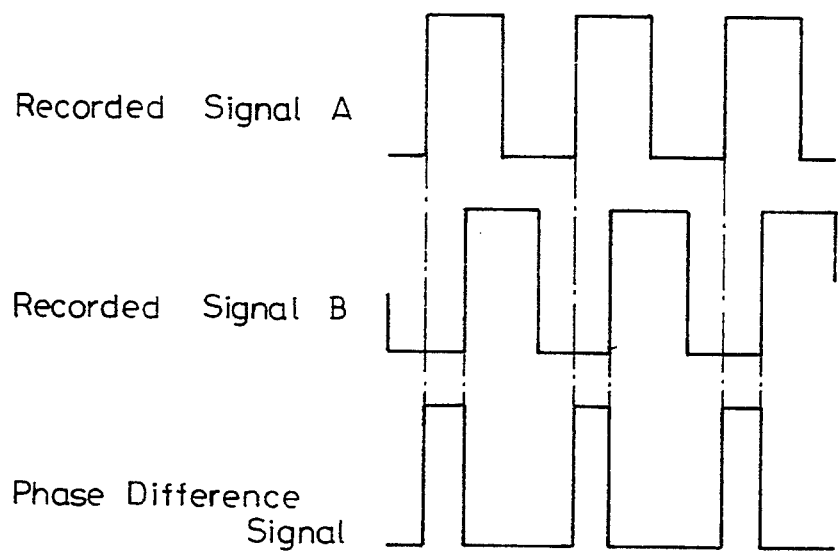
FIG. 3 is a drawing of recorded signals on magnetic films decoded with a pair of magnetic signal decoding heads when torque is working.

When receiving a torque by the turbine shaft 2, the recording signals A and B are detected with a pair of decoding heads 4 as shown in FIG. 3, and those detected signals are sent to a signal processing part 11. After processing the detected signals in the signal processing part 11 by each signal processing means 12, a phase difference signal between two magnetic signal decoding heads 4 (namely, between two magnetic films 3) is calculated by a phase difference calculating means 13. Thereafter, a torque which is necessary to cancel the phase difference between two magnetic signal decoding heads 4 is calculated by a torque calculating means 14 and the calculated torque is output outside the signal processing part 11.

Figure 4:
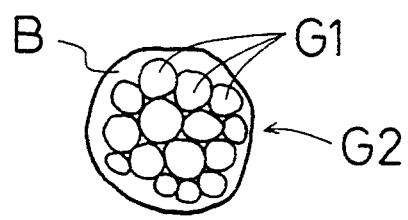
FIG. 4 is an explanatory drawing showing a thermal spraying particle.

The magnetic film 3 of the sensor 1 is obtained in the following manner as shown in FIG. 4. Minute magnetic particles G1 obtained by crushing particles capable of being magnetized, each size of which is not larger than 10 $\mu$m are mixed as they are dispersed with a binding material B. After the thermal spraying particles G2 each size of which is not smaller than 10 $\mu$m are obtained from the above mixture, the thermal spraying particles are sprayed upon the turbine shaft 2 with a plasma spraying method.

The detail of the method of obtaining the above magnetic film 3 is described below.

As a material for a magnetic particle, crystals consisting of cobalt or magnetic iron oxide capable of being magnetized are selected. The above minute magnetic particles G1 are obtained by crushing the above crystals to make each size not larger than 10 $\mu$m.

As a binding material B, one of resin materials such as polyvinyl alcohol, polyvinyl butyral and polyethylene glycol, or one of materials capable of being magnetized such as cobalt, nickel, and magnetic iron oxide is selected. Thermal spraying particles G2 each size of which is not smaller than 10 $\mu$m are obtained with mixing the minute magnetic particles G1 as they are dispersed with the binding material B. An atomizing method, a granulating method, and a crushing method are generally known as methods to obtain thermal spraying particles G2 from the minute particles G1.

Magnetic films 3 are formed at a predetermined space on the surface of the turbine shaft 2 by plasma spraying the thermal spraying particles G2 at the predetermined space circumferentially on the overall surface of the turbine shaft 2.

The reason why the particle size of minute magnetic particle is not larger than 10 $\mu$m is to increase the number of domain walls formed in the magnetic film 3 by increasing the number of magnetic particles G1 dispersed in the thermal spraying particles G2.

Because the residual magnetization of the magnetic film in the case when the value of the magnetic field has returned to 0 after a strong magnetic field was impressed can be enhanced by making the size of each minute magnetic particle G1 not larger than 10 $\mu$m, regenerated output at the time of measuring with the magnetic signal decoding head 4 can be enhanced. A write pitch on the magnetic film 3 at the time of recording magnetic signal on the magnetic film 3 can be narrowed down because a reverse magnetic field which is necessary to make the value of coercive force, namely residual magnetization, 0 is also enhanced.

When one of such magnetic materials capable of being magnetized as cobalt, nickel and iron is used as a binding material B, all materials comprising the thermal spraying particles are capable of being magnetized, so that regenerated output at the time of measuring with the magnetic decoding heads 4 is further increased and a write pitch at the time of recording magnetic signals can be further narrowed down.

The reason why the particle size of thermal spraying particle is not smaller than 10 $\mu$m is to avoid such problems that when the particle size is smaller than 10 $\mu$m the number of particles to be adhered on the surface of the turbine shaft 2 is reduced because the thermal spraying particles are so light that they are blown off by the flame at the time of plasma spraying the thermal spraying particles on the surface of the turbine shaft 2.

Less number of the thermal spraying particles 2 are blown off at the time of plasma spraying by using thermal spraying particles each size of which is not smaller than 10 $\mu$m and many thermal spraying particles G2 are adhered on the magnetic film 3.

An aluminum turbine shaft as a member to be sprayed is described in the above embodiment. However, the member to be sprayed does not have to be limited to an aluminum turbine shaft. An aluminum shaft, an aluminum board, an iron turbine shaft, an iron shaft or an iron board can be used. In the case of using an iron member to be sprayed, after forming such a nonmagnetic film consisting of a nonmagnetic material such as aluminum on the surface of the member to be sprayed, a magnetic film is formed on the above nonmagnetic film.

A description is made below of the first test evaluating a sensor having a magnetic film in the present invention.

Figure 5:
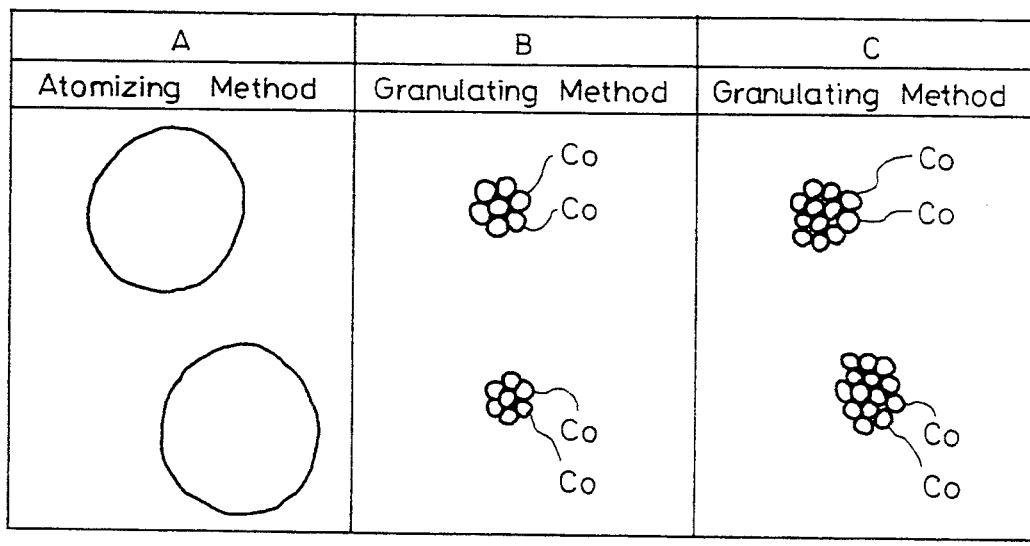
FIG. 5 is an explanatory drawing showing forms of thermal spraying particles.
Figure 5:
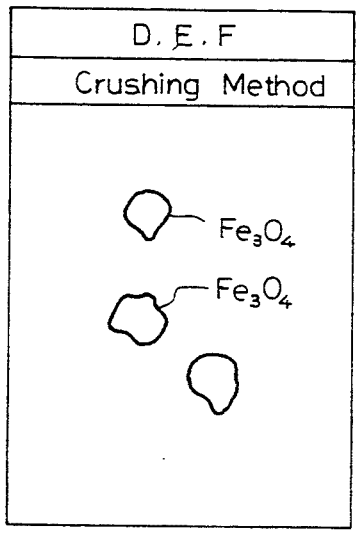
Figure 5:
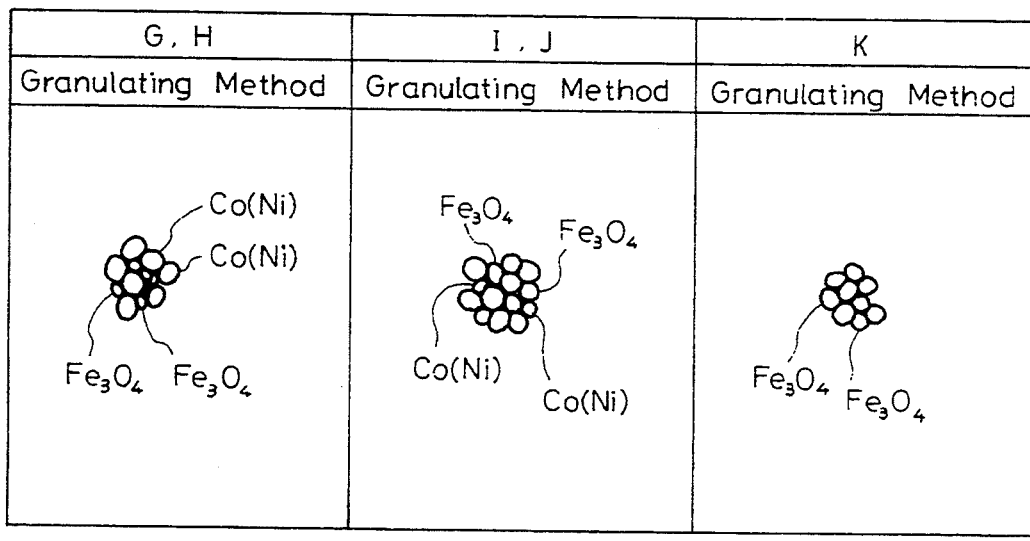

Cobalt is used as a magnetic material, and samples as thermal spraying particles listed in table 1 are prepared. In sample A an uncrushed magnetic particle is used, In sample B, the particle size of a minute magnetic particle G1 is not larger than 8 $\mu$m, of a thermal spraying particle G2 is 5–45 $\mu$m, and in sample C, the particle size of a minute magnetic particle G1 is not larger than 10 $\mu$m, of a thermal spraying particle G2 is 10–75 $\mu$m. As shown in FIG. 5, sample A is obtained by atomizing method, and samples B and C are obtained by granulating method.

TABLE 1

| Sample | Particle Size Distribution (μm) | Average Size of Thermal Spraying Particle (μm) | Size of Minute Magnetic Particle (μm) | Size of Thermal Spraying Particle (μm) |
| --- | --- | --- | --- | --- |
| A | 60–145 | 100 | — | — |
| B | 5–45 | 22 | not larger than 8 | 5–45 |
| C | 10–75 | 38 | not larger than 10 | 10–75 |

The thermal spraying particles are sprayed by plasma spraying on the surface of a shaft member having a diameter of 30 mm made of aluminum to form a magnetic film having a thickness of 100 μm. The thermal sprayings are conducted under the following condition;

Output 35 KW
Gas Pressure Ar:100 psi, H$_2$:50 psi
Gas Flow Mass Ar:100 scfh, H$_2$:10 scfh A magnetic signal was recorded on the magnetic film by writing pulse waves at 15V with a function generator as a magnetic signal recording head is contacted with the magnetic film of the shaft member rotating at the speed of 600 rpm.

Then, the magnetic signal is measured by a magnetic signal decoding head arranged in the manner of facing against the film 3 in stead of the magnetic recording head. The condition at the time of measuring is as follows;

Amplifier : 50×5 times
Filter : 50–100 KHz
Rotating Speed of the Shaft member : 600 rpm As a result, the regenerated output at the time of $1 \times 10^3$ Hz is 7 V in sample A, 12 V in sample B and 10 V in sample C. It is obvious from the result that regenerated output in sample B having the minute magnetic particle G1 of the smallest particle size is the largest and that in sample C having the minute magnetic particle G1 of the second smallest particle size is the second largest. The regenerated output in sample A having the thermal spraying particles of the largest particle size is the smallest of the three. It is understood from the above result that the more minute magnetic particles are contained, the larger the regenerated output is.

A description is made below of the second test evaluating a sensor having a magnetic film in the present invention.

Magnetic iron oxide particles are used as a magnetic material and samples of thermal spraying particles shown in table 2 are prepared. In samples D, E, F each particle size of the minute magnetic particle G1 is not larger than 10 μm, each particle size of the thermal spraying particle G2 is not smaller than 10 μm and average size of thermal spraying particle G2 in sample D is 39 μm, in sample E 29 μm, and in sample F 12 μm. In samples D, E, F all of the thermal spraying particles are obtained by a crushing method.

TABLE 2

| Sample | Particle Size Distribution (μm) | Average Size of Thermal Spraying Particle (μm) | Size of Minute Magnetic Particle (μm) | Size of Thermal Spraying Particle (μm) |
| --- | --- | --- | --- | --- |
| D | 10–63 | 39 | not larger than 10 | not smaller than 10 |
| E | 10–45 | 29 | not larger than 10 | not smaller than 10 |
| F | 5–30 | 12 | not larger than 10 | not smaller than 10 |

A magnetic film having a thickness of 100 μm is formed by spraying the thermal spraying particles on an aluminum shaft member having a diameter of 30 mm with plasma spraying method. The thermal sprayings are conducted under the following condition;

Output : 35 KW
Gas Pressure : Ar:100 psi; H$_2$:50 psi
Gas Flow Mass : Ar:80 scfh; H$_2$:15 scfh After a write of the magnetic signal on the magnetic film is conducted under the same condition as that in the first test, a magnetic signal is measured by the magnetic signal decoding head.

As a result, the regenerated output at the time of $1 \times 10^3$ Hz, is 5 V in sample D, 8 V in sample E, 9 V in sample F. The above result obviously shows that regenerated output in sample F of the thermal spraying particles having the smallest average particle size is the largest, and that regenerated output in sample E having the second smallest average particle size is the second largest next to that in sample F. Regenerated output in sample D having the thermal spraying particles of which average particle size is the largest is the smallest. According to the above result, it is understood that the smaller the average particle size thermal spraying particles is, the larger the regenerated output is.

A description is made below of the third test evaluating a sensor having a magnetic film in the present invention.

As shown in table 3, thermal spraying particles having 20 wt % of such a magnetic material as cobalt particles or nickel particles mixed with such magnetic particles as magnetic iron oxide particles, and thermal spraying particles having such a magnetic material as magnetic iron oxide particles mixed with an organic binder are prepared. In sample G particles of magnetic iron oxide each size of which is 10–45 μm are mixed with cobalt each size of which is not larger than 10 μm, In sample H particles of magnetic iron oxide each size of which is 10–45 μm are mixed with nickel particles each size of which is not larger than 10 μm. In sample I particles of magnetic iron oxide each size of which is not larger than 10 μm are mixed with cobalt each size of which is not larger than 10 μm. In sample J particles of magnetic iron oxide each size of which is not larger than 10 μm are mixed with nickel each size of which is not larger than 10 μm. In sample K magnetic iron oxide particles each size of which is not larger than 10 μm are mixed with such an organic binding material as polyvinyl alcohol. As shown in FIG. 5, samples G, H, I, J and K are made by granulating method, and all of the particle size distributions are 10–45 μm.

TABLE 3

| Sample | Size of Magnetic Iron Oxide Particle (μm) | Size of Cobalt Particle (μm) | Size of Nickel Particle (μm) | Additional Amount (wt %) |
| --- | --- | --- | --- | --- |
| G | 10–45 | not larger than 10 | — | 20 |
| H | 10–45 | — | not larger than 10 | 20 |
| I | not larger than 10 | not larger than 10 | — | 20 |
| J | not larger than 10 | — | not larger than 10 | 20 |
| K | not larger than 10 | Binder of Organic Materials | | |

A magnetic film having a thickness of 100 μm is formed by spraying the thermal spraying particles upon the surface of an aluminum shaft having a diameter of 30 mm with plasma spraying method. The thermal spraying are conducted under the following conditions;
 Output: 35 KW
 Gas Pressure: Ar : 100 psi $H_2$:50 psi
 Gas Flow Mass: Ar: 80 scfh $H_2$:15 scfh After writing of a magnetic signal on the magnetic film under the same condition as the one in the first test is conducted, a magnetic signal are measured by the magnetic decoding head.

As a result, regenerated output at the frequency of $1 \times 10^3$ Hz is 8.5 V in sample G, 8.0 V in sample H, 9.5 V in sample I, 9.0 V in sample J, and 8.0 V in sample K. The above result obviously shows that regenerated output in sample I and J having magnetic iron oxide particles of the small particle size is larger than that in sample G and H having magnetic iron oxide particle of the large particle size. Regenerated output of the sample G, H, I and J for which a magnetic material is used as a binder is larger than that of the sample K for which an organic material is used as a binder. It is also found that cobalt is superior to nickel as a binder.

A description is made below of the fourth test evaluating a sensor having a magnetic film in the present invention.

Figures 6, 7:
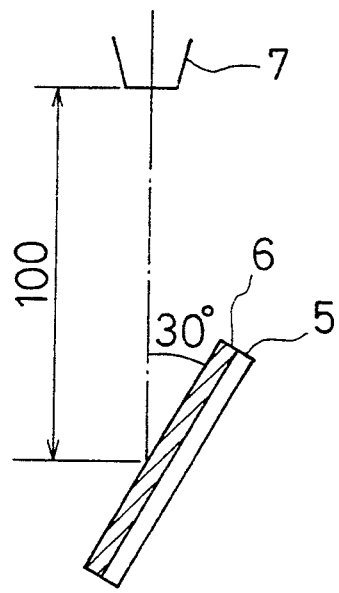
FIG. 6 is an explanatory drawing of a blast erosion test.
FIG. 7 is a graph showing volume decreases by a blast erosion.

A magnetic film 6 having a thickness of 200 μm is formed by spraying the thermal spraying particles consisting of A, B, C, D, E, F, G, H, I, J and K respectively on the surface of aluminum board 5 with plasma spraying method. The thermal sprayings are conducted under the following conditions;
 Output : 35 KW
 Gas Pressure : Ar: 100 psi $H_2$:50 psi
 Gas Flow Mass : Ar: 80 scfh $H_2$:15 scfh Then, as shown in FIG. 6, a blast erosion test is conducted by jetting a blast from a blast nozzle 7 having a diameter of 5 mm. The blast erosion test is conducted under the following conditions;
 Blast Material: Alumina #60
 Blasting pressure: kg/$cm^2$
 Blasting hour: 10 sec The result is shown in FIG. 7. It shows that as volume decreases in sample A, B, C respectively are less than the one in sample C, D and E respectively, a thermal spraying particle consisting of cobalt particles has stronger adhesion strength than a thermal spraying particle consisting of magnetic iron oxide particles, and shows that the volume decreases in sample G, H, I and J respectively are less than the one in sample D, E, and F respectively, and adhesion strength is stronger in case of adding cobalt particles or nickel particles, than the one in case of using magnetic iron oxide particles only.

What is claimed is:

1. A method of manufacturing a sensor having a magnetic film for sensing either torque, rotating speed or rotating angle of a shaft member comprising the steps of:
 crushing particles capable of being magnetized to obtain minute magnetic particles, each size of which is not larger than 10 μm;
 forming thermal spraying particles, each size of which is not smaller than 10 μm by mixing said minute magnetic particles with a binding material in which said minute magnetic particles are dispersed;
 forming a nonmagnetic film composed of a nonmagnetic material on a circumferential surface of said shaft member; and
 forming a magnetic film, which is capable of recording a magnetic signal, on said nonmagnetic film by spraying said thermal spraying particles upon said nonmagnetic film.

2. A method of manufacturing a sensor having a magnetic film, as defined in claim 1, wherein said particles capable of being magnetized consist essentially of iron oxide.

3. A method of manufacturing a sensor having a magnetic film as defined in claim 1, wherein said particles capable of being magnetized consist essentially of cobalt.

4. A method of manufacturing a sensor having a magnetic film as defined in claim 1, wherein said binding material is a metal selected from the group consisting of cobalt, nickel and iron oxide.

5. A method of manufacturing a sensor having a magnetic film as defined in claim 1, wherein said binding material is a resin.

6. A method of manufacturing a sensor having a magnetic film as defined in claim 1, wherein the thermal spraying step is by plasma spraying.

* * * * *